United States Patent [19]

Yamazaki

[11] Patent Number: 4,528,252
[45] Date of Patent: Jul. 9, 1985

[54] LIGHT ENERGY CONVERSION SYSTEM
[75] Inventor: Shunpei Yamazaki, Tokyo, Japan
[73] Assignee: Semiconductor Energy Laboratory Co., Ltd., Japan
[21] Appl. No.: 479,558
[22] Filed: Mar. 28, 1983
[30] Foreign Application Priority Data Mar. 29, 1982 [JP] Japan .................. 57-50534

[51] Int. Cl.³ .......................... H01M 6/36; C25B 1/02
[52] U.S. Cl. ................................... 429/111; 204/129; 204/266; 204/278
[58] Field of Search ................ 429/111; 204/129, 266, 204/278

[56] References Cited

U.S. PATENT DOCUMENTS 4,021,323 5/1977 Kilby et al. ........................ 204/129
4,381,233 4/1983 Adachi et al. ..................... 204/242
4,388,482 6/1983 Hamakawa et al. ......... 136/258 AM

FOREIGN PATENT DOCUMENTS 52-12693 1/1977 Japan ................... 429/111
54-4582 1/1979 Japan ................... 429/111

OTHER PUBLICATIONS

R. Williams, "Schottky Barriers at the Interface Between Amorphous Silicon & Electrolytes", *J. Appl. Physics*, vol. 50, pp. 2848-2851, (1979).
J. Manassen et al., "Electrochemical, Solid State, Photochemical, & Technological Aspects of Photoelectrochemical Energy Converters", *Nature*, vol. 263, pp. 97-100, (1976).
M. S. Wrighton, "Photochemistry", *Chem. & Eng. News*, Sep. 3, 1979, p. 37.
A. J. Nozik, "Photochemical Diodes", *Appl. Phys. Lett.*, vol. 30, pp. 567-569, (1977).

*Primary Examiner*—Aaron Weisstuch
*Attorney, Agent, or Firm*—Murray, Whisenhunt & Ferguson

[57] ABSTRACT

A semiconductor photoelectric conversion structure having a PIN junction is assembled as a unitary structure with a redox chamber, with the P (or N) type semiconductor layer of the former being heavily doped and held in contact with an aqueous solution contained in a cell compartment of the redox reaction chamber. By interconnecting a second electrode connected to the N (or P) type semiconductor layer of the semiconductor photoelectric conversion structure and a first electrode held in contact with an aqueous solution contained in another cell compartment of the redox reaction chamber, $H_2$ (or $O_2$) and $O_2$ (or $H_2$) gases are released from the first and second cells, respectively. Alternatively, electric power may be generated by connecting a first lead to the P (or N) type layer and a second lead to the second electrode.

17 Claims, 6 Drawing Figures

LIGHT ENERGY CONVERSION SYSTEM

BACKGROUND OF THE INVENTION

1. Field of the Invention

The present invention relates to a light energy conversion system and, more particularly, to a light energy conversion system which converts light energy into electrical energy and electrolyzes an aqueous solution by the electrical energy to generate oxygen and hydrogen gases.

2. Description of the Prior Art

Heretofore there have been proposed various light energy conversion systems of this type, which are usually provided with a semiconductor photoelectric conversion structure for converting light energy into electrical energy, an electrolyzer provided separately of the semiconductor photoelectric conversion structure and comprising a redox reaction chamber containing an aqueous solution, for electrolyzing the aqueous solution by the electrical energy to generate oxygen and hydrogen gases and first and second electrodes held in contact with the aqueous solution in the redox reaction chamber, and first and second connecting means for electrically interconnecting a pair of electrodes of the semiconductor photoelectric conversion structure and the first and second electrodes of the electrolyzer.

Such prior art light energy conversion systems are bulky as a whole because the photoelectric conversion semiconductor structure and the electrolyzer are provided separately of each other.

Furthermore, the conventional systems require the first and second electrodes in contact with the aqueous solution contained in the redox reaction chamber of the electrolyzer and necessitate the first and second connecting means for electrically connecting the semiconductor photoelectric conversion structure to the electrodes held in contact with the aqueous solution contained in the redox reaction chamber of the electrolyzer. Accordingly, the prior art light energy conversion systems are disadvantageous in that they involve the use of a large number of parts and require much time for electrically connecting the semiconductor photoelectric conversion structure to the electrodes held in contact with the aqueous solution in the redox reaction chamber.

SUMMARY OF THE INVENTION

It is therefore an object of the present invention to provide a novel light energy conversion system which is free from the abovesaid defects of the prior art.

Briefly stated, the light energy conversion system of the present invention comprises a redox reaction chamber provided with first and second cells intercommunicating through a bridge and respectively containing first and second aqueous solutions of the same kind, and first and second gas outlet means respectively extending outwardly of the first and second cells; a semiconductor photoelectric conversion structure having a first semiconductor layer of a P or N first conductivity type, an I type (intrinsic) second semiconductor layer formed on the first semiconductor layer and a heavily doped, third semiconductor layer of second conductivity type opposite that facing the first conductivity type of the first semiconductor layer, formed on the second semiconductor layer and held in contact with the second aqueous solution in the second cell of the redox reaction chamber on the side opposite the second semiconductor layer; a first electrode in contact with the first aqueous solution contained in the first cell of the redox reaction chamber; a second electrode connected with the first semiconductor layer of the semiconductor photoelectric conversion structure and paired with the first electrode; and electrical connecting means for electrically interconnecting the first and second electrodes.

According to the light energy conversion system of the present invention, when the semiconductor photoelectric conversion structure is exposed to irradiation by light, electric power is generated between the third semiconductor layer and the second electrode. The first electrode makes contact with the first aqueous solution contained in the first cell of the redox reaction chamber, and the third semiconductor layer of the semiconductor photoelectric conversion structure makes contact with the second aqueous solution in the second cell of the redox reaction chamber, the third semiconductor layer serving as an electrode paired with the first electrode.

Accordingly, by electrically connecting the first and second electrodes through electric connecting means, a first redox reaction, which is either one of anodic and cathodic reactions, occurs on the side of the first cell of the redox reaction chamber and, on the side of the second cell, a second redox reaction occurs which is opposite to the first redox reaction.

As a result of this, a first gas, which is either one of oxygen and hydrogen gases, is generated on the side of the first cell and it can be recovered through the first gas outlet means. On the side of the second cell, a second gas which is the other of the oxygen and hydrogen gases is generated and it can also be recovered through the second gas outlet means.

According to the light energy conversion system of the present invention, the semiconductor photoelectric conversion structure and the redox reaction chamber are formed as a unitary structure with each other, with the third semiconductor layer of the semiconductor photoelectric conversion structure held in contact with the second aqueous solution contained in the second cell of the redox reaction chamber. Therefore, the light energy conversion system of the present invention can be made compact as compared with the aforementioned conventional light energy conversion systems.

Besides, according to the light energy conversion system of the present invention, the only electrode which is held in contact with the aqueous solution contained in the redox reaction chamber is the first electrode, which makes contact with the first aqueous solution in the first cell of the redox reaction chamber. Moreover, the electric connecting means which makes contact with the semiconductor photoelectric conversion structure and the aqueous solution contained in the redox reaction chamber may be only means for electrically connecting the first and second electrodes. Accordingly, as compared with the prior art systems, the system of the present invention has the advantages that the number of parts used is small and that the electrical connection of the semiconductor photoelectric conversion structure and the electrode held in contact with the aqueous solution in the redox reaction chamber is simple.

Other objects, features and advantages of the present invention will become more fully apparent from the following description taken in conjunction with the accompanying drawings.

DESCRIPTION OF THE PREFERRED EMBODIMENTS

Figure 1:
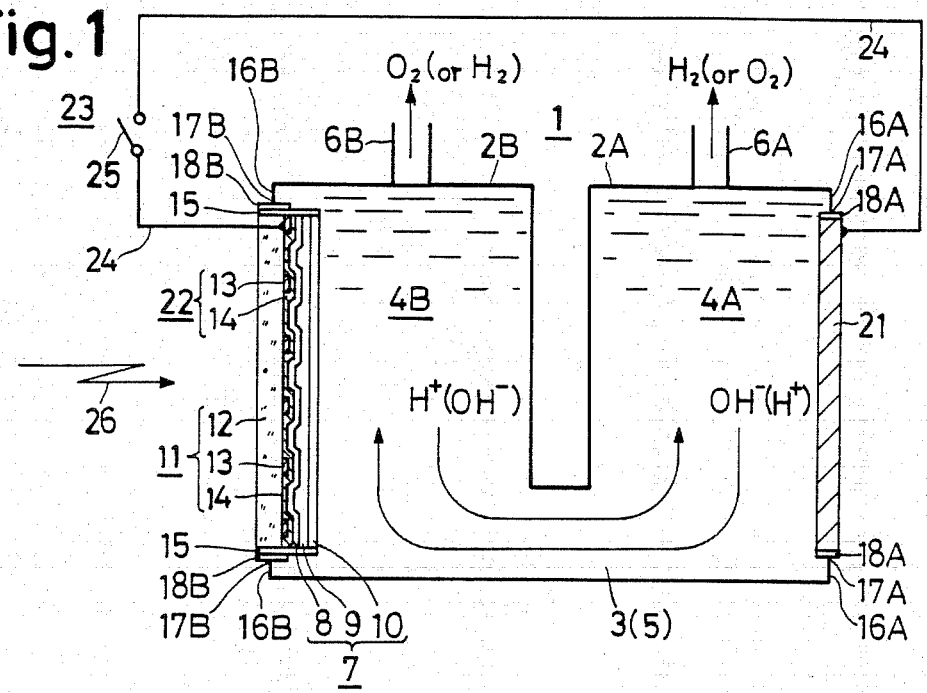
FIG. 1 is a sectional view schematically illustrating a first embodiment of the light energy conversion system of the present invention.

FIG. 1 illustrates in section a first embodiment of the light energy conversion system of the present invention, which is provided with a redox reaction chamber 1.

The reaction chamber 1 comprises first and second cells 2A and 2B, which intercommunicate through a bridge 3 and have introduced thereinto first and second aqueous solutions 4A and 4B of the same kind, respectively.

The bridge 3 is an aqueous solution bridge 5 which permits the passage therethrough of the aqueous solutions 4A and 4B locally between the cells 2A and 2B, for example, at the lower end portion thereof.

The aqueous solution contained in the cells 2A and 2B may be one that consists of pure water as solvent and a small amount of electrolyte for promoting ionization, such as tin-iodinate or the like.

The redox reaction chamber 1 has first and second gas outlet means 6A and 6B formed integrally therewith to extend upwardly, for instance, from the top end portions of the cells 2A and 2B, respectively.

The first embodiment of the light energy conversion system of the present invention is provided with a semiconductor photoelectric conversion structure 7 in addition to the abovesaid redox reaction chamber 1.

The semiconductor photoelectric conversion structure 7 comprises a first semiconductor layer 8 of a first conductivity type which is one of P and N conductivity types, an I type second semiconductor layer 9 formed on the first semiconductor layer 8 and a heavily doped, third semiconductor layer 10 opposite in conductivity type from the semiconductor layer 8, that is, a second conductivity type, and formed on the layer 9.

Such a semiconductor photoelectric conversion structure 7 is formed, in practice, by conventional CVD, reduced pressure CVD, or a plasma CVD method on a light transparent conductive substrate 11. In this case, the light transparent conductive substrate 11 has a light transparent insulating substrate proper 12, a comb-shaped lead-out electrode 13 formed on the light transparent conductive substrate 11 and a light transparent conductive film 14 formed on the light transparent conductive substrate 11 to cover the lead-out electrode 13.

In this case, the light transparent insulating substrate 12 may be formed of glass. The light transparent conductive film 14 may be a combination of indium oxide and tin oxide, and the lead-out electrode 13 may be formed of aluminum.

The lead-out electrode 13 and the light transparent conductive film 14 constitute a first electrode 22 described later.

In the case where the semiconductor photoelectric conversion structure 7 is formed by the aforementioned methods, the semiconductor layers 8, 9, and 10 are each formed of a non-single crystal semiconductor, in particular, an amorphous semiconductor, a semi-amorphous semiconductor containing microcrystals on the order of 5 to 100 Å, or a microcrystalline or polycrystalline semiconductor.

The non-single crystal semiconductor forming the semiconductor layers 8, 9, and 10 may be non-single crystal silicon (Si), germanium silicide, silicon nitride ($Si_3N_{4-x}$ ($0<x<4$)), or silicon carbide ($Si_xC_{1-x}$ ($0<x<1$)). In particular, since the semiconductor layer 8 is on the side on which light is incident, the non-single crystalline semiconductor forming the layer 8 may preferably be silicon nitride ($Si_3N_{4-x}$) or silicon carbide ($Si_xC_{1-x}$) having a relatively wide band gap energy Eg of 1.8 to 2.5 eV, as will be appreciated from the following description. It is also preferable, however, to employ for forming the semiconductor layer 8 amorphous or semi-amorphous silicon having a band gap energy Eg of 1.6 to 1.9 eV for the reason that in the case of the incident light being sunlight, its absorption coefficient in the short wavelength region from 3500 to 5000 Å is 10 to 30 times larger than that of single crystal silicon. The semiconductor layer 8 can be formed as thin as 50 to 500 Å.

For the abovesaid reason, it is preferable that the non-single crystal semiconductor forming the semiconductor layer 9 be amorphous or semi-amorphous silicon. The semiconductor layer 9 can be formed to a thickness of 0.5 to 1 $\mu$m, in particular, 0.5 $\mu$m.

The non-single crystal semiconductor forming the semiconductor layer 10 may preferably be amorphous or semi-amorphous $Si_3N_{4-x}$ ($0<x<4$) or $Si_xC_{1-x}$ ($0<x<1$), in particular, amorphous or semi-amorphous $Si_3N_{4-x}$ ($x=3.5$ to $3.95$) or $Si_xC_{1-x}$ ($x=0.2$ to $0.7$) having a band gap energy Eg in the range of 1.8 to 2.8 eV because it is desirable that the semiconductor layer 10 be highly resistant (i.e., inert) to a redox reaction between it and the aqueous solution contained in the cell 2B described later. The semiconductor layer 10 can be made as thin as 50 to 500 Å.

When the semiconductor layer 10 has N type conductivity, it contains an N type impurity. As the N type impurity, all Group VA elements can be used, but it is preferable to employ antimony (Sb), arsenic (As), or phosphorous (P) on the ground that the semiconductor layer 10 can obtain a relatively high electric conductivity of $10^{-5}$ to $10^{-6}$ $(\Omega \cdot cm)^{-1}$ with a relatively small amount of N type impurity. In the case where the semiconductor layer 10 contains the N type impurity Sb, As, or P, its content can be selected to be 0.01 to 3 mol % with respect to the semiconductor forming the layer 10.

When the conductivity type of the semiconductor layer 10 is P, it contains a P type impurity. As the P type impurity, all Group IIIA elements can be used, but it is preferable to employ indium (In), gallium (Ga), or aluminum (Al) because the semiconductor layer 10 can obtain a relatively high electric conductivity with a relatively small amount of P type impurity and because even if the abovesaid elements are oxidized, they still remain conductive. In the case where the semiconductor layer 10 contains the P type impurity In, Ga, or Al, its content can be selected in the range of 0.01 to 3 mol %.

The semiconductor photoelectric conversion structure 7 is disposed so that, of its semiconductor layers 8, 9, and 10, only the semiconductor layer 10 makes contact with the aqueous solution 4B contained in the cell 2B as described below.

The outer marginal edge of the semiconductor photoelectric conversion structure 7 is covered with a liquid-tight insulating protective film 15. On the other hand, a window 17B is formed in an outer side wall 16B of the redox reaction chamber 1 on the side of the cell 2B.

The semiconductor photoelectric conversion structure 7 is disposed in the window 17B to close it, with the surface of the semiconductor layer 10 on the opposite side from the layer 9 held in contact with the aqueous solution 4B contained in the cell 2B, the semiconductor structure 7 being fixedly attached to the window 17B through an adhesive binder 18B applied between the insulating protective film 15 and the inside of the window 17B. The semiconductor photoelectric conversion structure 7 forms a part of the outer side wall 16B of the cell 2B of the redox reaction chamber 1.

The first embodiment of the light energy conversion system of the present invention has a first electrode 21 for contact with the aqueous solution 4A contained in the cell 2A, which is, for example, plate-shaped.

The first electrode 21 is disposed in contact with the aqueous solution 4A, for instance, as follows:

A window 17A is formed in the outer side wall 16A of the redox reaction chamber 1 on the side of the cell 2A. The plate-shaped first electrode 21 is disposed in the window 17A to close it, with one side of the electrode 21 held in contact with the aqueous solution 4A, the electrode 21 being fixedly attached to the window 17A through an adhesive binder 18A applied between the electrode 21 and the inside of the window 17A. The first electrode 21 forms a part of the outer side wall 16A of the redox reaction chamber 1 on the side of the cell 2A.

Furthermore, the first embodiment of the light energy conversion system of the present invention is provided with a second electrode 22 which is connected with the semiconductor layer 8 of the semiconductor photoelectric conversion structure 7 and is paired with the abovesaid first electrode 21. The second electrode 22 is formed, for instance, by the lead-out electrode 13 and the light transparent conductive film 14 described previously.

The first embodiment of the light energy conversion system of the present invention is further provided with electric connecting means 23 for electrically interconnecting the first and second electrodes 21 and 22.

The electric connecting means 23 has, for example, such a construction that a switch 25 is inserted in a lead wire 24 connected at one end to the lead-out electrode 13 forming the first electrode 22 and connected at the other end to the above-mentioned electrode 21.

The above is a description of the first embodiment of the light energy conversion system of the present invention.

With such an arrangement of the light energy conversion system of the present invention as described above, when light 26 is incident on the semiconductor photoelectric conversion structure 7 through the light transparent conductive substrate 11, electric power is generated between the semiconductor layer 10 of the photoelectric conversion semiconductor structure 7 and the electrode 22.

The electrode 21 makes contact with the aqueous solution 4A contained in the cell 2A of the redox reaction chamber 1 and the semiconductor layer 10 of the semiconductor photoelectric conversion structure 7, serving as an electrode paired with the electrode 21, makes contact with the aqueous solution 4B contained in the cell 2B of the redox reaction chamber 1.

Accordingly, by closing the switch 25 to electrically interconnect the electrodes 21 and 22, a first redox reaction which is either one of anodic and cathodic reactions occurs on the side of the cell 2A of the redox reaction chamber and, on the side of the cell 2B, a second redox reaction occurs which is reverse from the first redox reaction.

In the case where the conductivity type of the semiconductor layer 10 of the photoelectric conversion semiconductor structure 7 is N type, the polarity of the electric current generated across the semiconductor layer 10 and the electrode 22 is positive on the side of the electrode 22 and negative on the side of the semiconductor layer 10. On the other hand, in the aqueous solutions 4A and 4B contained in the cells 2A and 2B, hydrogen ions ($H^+$) and hydroxyl group ions ($OH^-$) are formed. Therefore, the anodic oxidation reaction occurs on the side of the aqueous solution 4A to generate oxygen gas ($O_2$), which can be recovered through the gas outlet means 6A. On the side of the aqueous solution 4B a cathodic reduction reaction occurs to generate hydrogen gas ($H_2$), which can be recovered through the gas outlet means 6B. In this case, the $OH^-$ and $H^+$ ions are consumed on the sides of the aqueous solutions 4A and 4B, respectively, but extra $H^+$ and $OH^-$ ions remaining unconsumed respectively flow towards the aqueous solutions 4B and 4A through the bridge 3, resulting in continuous generation of the gases $O_2$ and $H_2$ on the sides of the aqueous solutions 4A and 4B, respectively.

In the case where the semiconductor layer 10 of the semiconductor photoelectric conversion structure 7 is of P conductivity type, the polarity of the electric current generated across the semiconductor layer 10 and the electrode 22 is negative on the side of the electrode 22 relative to the semiconductor layer 10. Accordingly, the cathodic reduction reaction occurs on the side of the aqueous solution 4A to generate hydrogen gas ($H_2$), which is recovered through the gas outlet means 6A. On the side of the aqueous solution 4B the anodic oxidation reaction occurs to generate oxygen gas ($O_2$), which can be recovered through the gas outlet means 6B. In this case, conversely to the abovesaid case, the $H^+$ and $OH^-$ ions are consumed on the sides of the aqueous solutions 4A and 4B, respectively. Also in this case, extra $OH^-$ and $H^+$ ions remain unconsumed on the sides of the aqueous solutions 4A and 4B, respectively, and they flow through the bridge 3 towards the sides of the aqueous solutions 4B and 4A, resulting in continuous generation of the $H_2$ and $O_2$ gases.

As described above, the first embodiment of the present invention exhibits a light energy converting function which converts light energy into electric energy and electrolyzes an aqueous solution by the electric energy to thereby generate oxygen and hydrogen gases.

According to the first embodiment of the present invention, the semiconductor photoelectric conversion structure 7 and the redox reaction chamber 1 are formed as a unitary structure, with the semiconductor layer 10 held in contact with the aqueous solution 4B contained in the cell 2B of the redox reaction chamber 1. Accordingly, the light energy conversion system of this embodiment can be made small and compact as a whole as compared with the conventional light energy conversion systems.

Furthermore, according to the first embodiment of the present invention, the only electrode which makes contact with the aqueous solution in the redox reaction chamber 1 is the electrode 21 making contact with the aqueous solution 4A in the cell 2A of the redox reaction chamber 1. Moreover, the means for electrically interconnecting the semiconductor photoelectric conversion structure 7 and the electrode 21 making contact with the aqueous solution in the redox reaction chamber 1 is only the electric connecting means 23.

Therefore, the first embodiment of the present invention is advantageous over the prior art systems in that the number of parts used is small and the procedure for electrically connecting the semiconductor photoelectric conversion structure and the electrode contacting with the aqueous solution in the redox reaction chamber is less troublesome.

Figure 2:
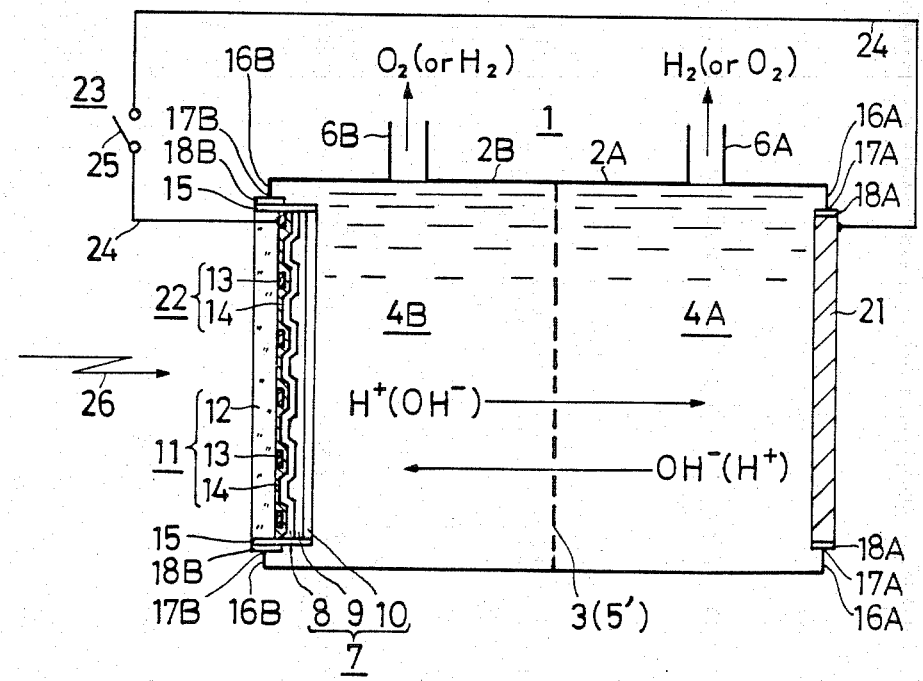
FIG. 2 is a sectional view schematically illustrating a second embodiment of the light energy conversion system of the present invention.

Next, a description will be given, with reference to FIG. 2, of a second embodiment of the light energy conversion system of the present invention. In FIG. 2, the parts corresponding to those in FIG. 1 are identified by the same reference numerals.

The second embodiment of the present invention is identical in construction with the first embodiments shown in FIG. 1 except that the aqueous solution bridge 5 forming the bridge 3 of the redox reaction chamber 1 is replaced with an ion exchange membrane forming an ion bridge 5'.

Even if the bridge 3 of the redox reaction chamber 1 is the ion bridge 5', ions generated in the aqueous solutions 4A and 4B contained in the cells 2A and 2B of the redox reaction chamber 1 can migrate to the aqueous solutions 4B and 4A.

Accordingly, though not described in detail, the second embodiment of the present invention shown in FIG. 2 also possesses similar excellent features as the first embodiment of FIG. 1.

Next, a description will be given, with reference to FIGS. 3 and 4, of third and fourth embodiments of the present invention, in which the parts corresponding to those in FIGS. 1 and 2 are identified by the same reference numerals.

The third and fourth embodiments of the present invention are identical in construction with the first and second embodiments of FIGS. 1 and 2 except that aqueous solution inlet means 30 is provided for introducing the aqueous solution 4 into the cells 2A and 2B of the redox reaction chamber 1.

Figure 3:
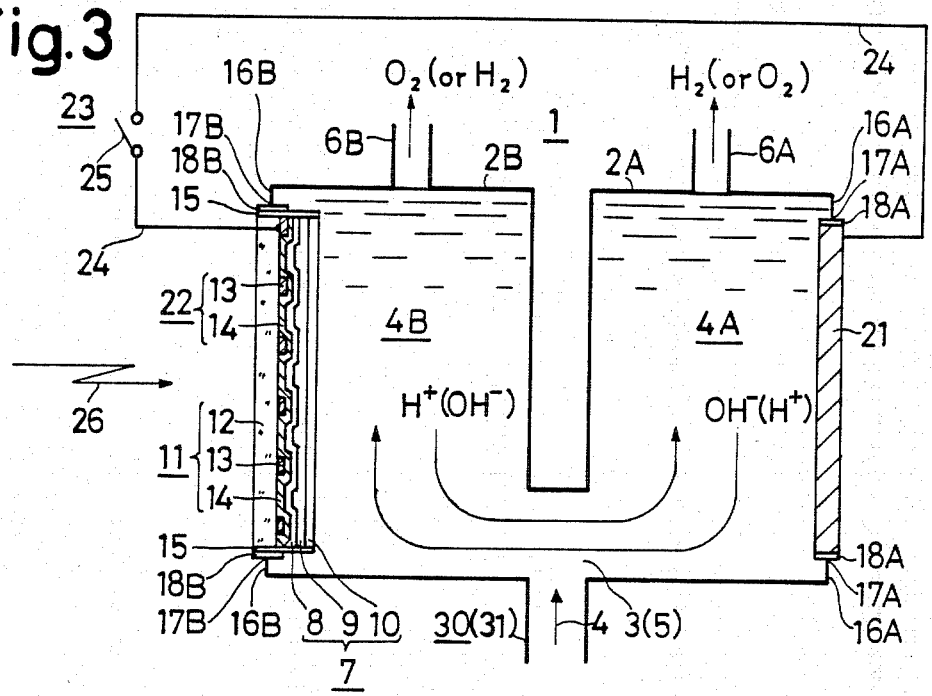
FIG. 3 is a sectional view schematically illustrating a third embodiment of the light energy conversion system of the present invention.

In the third embodiment, shown in FIG. 3, the aqueous solution inlet means 30 is formed by a pipe 31 which is formed integrally with the redox reaction chamber 1 to extend outwardly thereof, for example, from the bottom of the bridge 3 and permits the passage therethrough of the aqueous solution 4 into the cells 2A and 2B.

Figure 4:
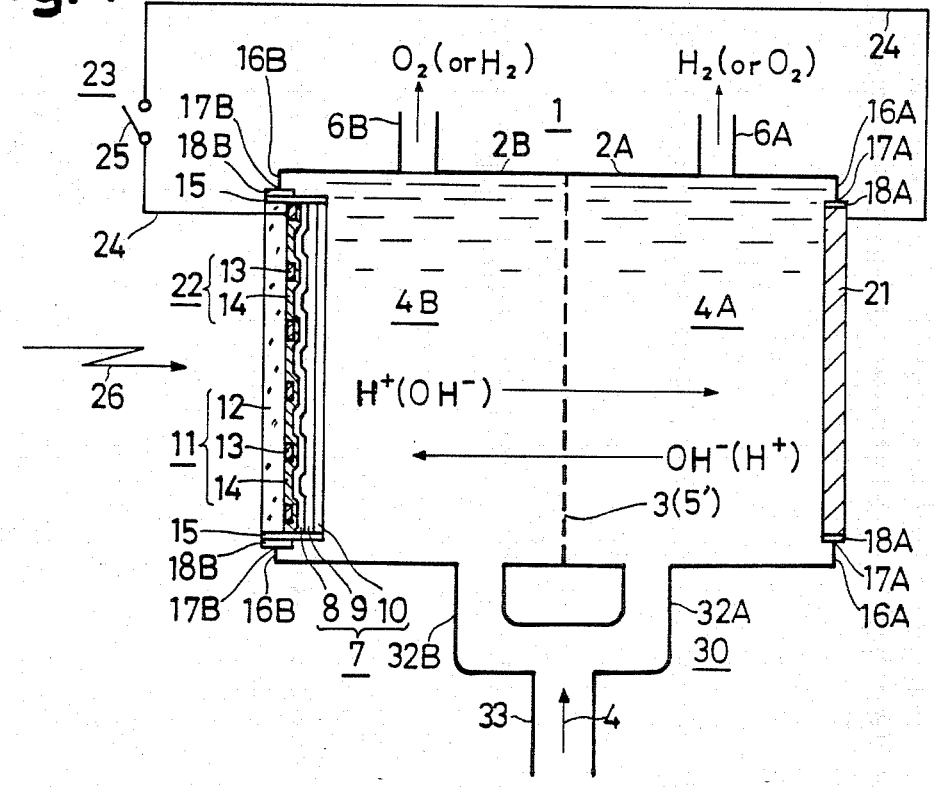
FIG. 4 is a sectional view schematically illustrating a fourth embodiment of the light energy conversion system of the present invention.

In the fourth embodiment, shown in FIG. 4, the aqueous solution inlet means 30 is formed by branch pipes 32A and 32B extending outwardly of the bottoms of the cells 2A and 2B of the redox reaction chamber 1 and a pipe 33 formed integrally with the branch pipes 32A and 32B to extend from their ends in common to them.

Though not described in detail, the third and fourth embodiments of FIGS. 3 and 4 also possess similar excellent features as the first and second embodiments shown in FIGS. 1 and 2.

Furthermore, in the third and fourth embodiments shown in FIGS. 3 and 4, the aqueous solutions 4A and 4B in the cells 2A and 2B of the redox reaction chamber 1 are consumed by releasing the hydrogen (or oxygen) and oxygen (or hydrogen) gases to the outside through the gas outlet means 6A and 6B, but the consumption of the aqueous solutions 4A and 4B is made up for by the supply of the aqueous solution 4 into the redox reaction chamber 1 through the aqueous solution inlet means 30.

Accordingly, the third and fourth embodiments of FIGS. 3 and 4 possess the advantage that the oxygen and hydrogen gases can be generated continuously over a long period of time.

Next, a description will be given, with reference to FIGS. 5 and 6, of fifth and sixth embodiments of the light energy conversion systems of the present inventions, in which the parts corresponding to those in FIGS. 3 and 4 are identified by the same reference numerals.

Figure 5:
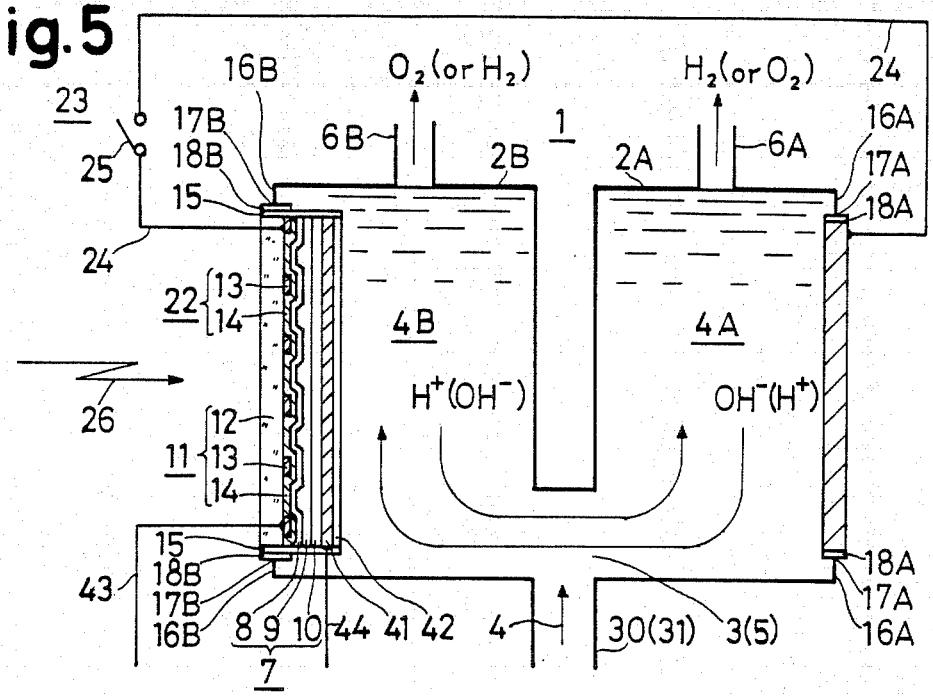
FIG. 5 is a sectional view schematically illustrating a fifth embodiment of the light energy conversion system of the present invention.
Figure 6:
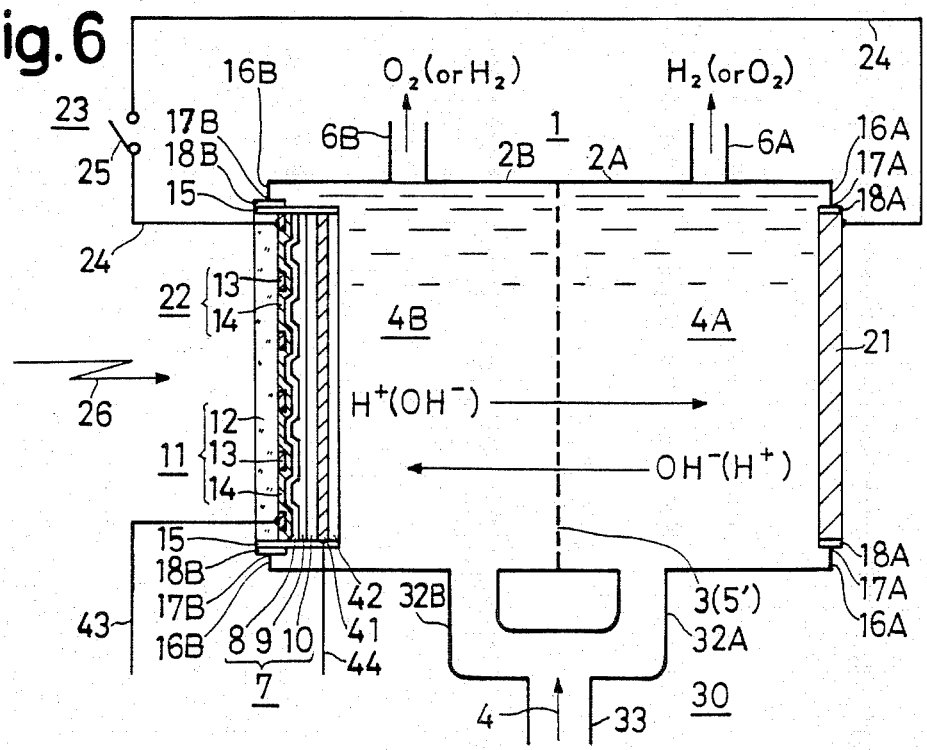
FIG. 6 is a sectional view schematically illustrating a sixth embodiment of the light energy conversion system of the present invention.

The fifth and sixth embodiments illustrated in FIGS. 5 and 6 are identical in construction with the third and fourth embodiments of FIGS. 3 and 4 except that the semiconductor layer 10 of the semiconductor photoelectric conversion structure 7 is covered with a metallic conductive layer 41, which is, in turn, covered with a semiconductor layer 42 of the same conductivity type as that of the semiconductor layer 10.

Accordingly, in the fifth and sixth embodiments of FIGS. 5 and 6, only the semiconductor layer 42 is held in contact with the aqueous solution 4B contained in the cell 2B of the redox reaction chamber 1, instead of the semiconductor layer 10 of the semiconductor photoelectric conversion structure 7 in the previous embodiments shown in FIGS. 1–4.

In this case, the metallic conductive layer 41 forming a part of the semiconductor photoelectric conversion structure 7 can be formed by known CVD, reduced pressure CVD, or a plasma CVD method or, in some cases, by a vacuum evaporation method.

Moreover, the semiconductor layer 42 of the semiconductor photoelectric conversion structure 7 is formed by the known CVD, reduced pressure CVD, or plasma CVD method as is the case with the other semiconductor layers 8, 9 and 10.

In the case where the semiconductor layer 42 is formed by the abovesaid method, it is formed of a non-single crystal semiconductor, in particular, an amorphous or semi-amorphous semiconductor. The semiconductor layer 42 makes contact with the aqueous solution 4B in the cell 2B of the redox reaction chamber 1 and performs the redox reaction with the aqueous solution as described previously with respect to FIG. 1; therefore, it is desirable that the semiconductor layer 42 be highly resistant (i.e., inert) to the redox reaction. For this reason, it is preferable that the semiconductor layer 42 be formed of amorphous or semi-amorphous $Si_3N_{4-x}$ ($0 < x < 4$) or $Si_xC_{1-x}$ ($0 < x < 1$), in particular, amorphous or semi-amorphous $Si_3N_{4-x}$ ($x = 3.5$ to $3.95$) or $Si_xC_{1-x}$ ($x = 0.2$ to $0.7$) which has a band gap energy Eg in the range of 1.8 to 2.8 eV. The semiconductor layer 42 can be made as thin as 50 to 500 Å.

Besides, the semiconductor layer 10 does not make contact with the aqueous solution 4B in the cell 2B of the redox reaction chamber 1, and hence it need not always be formed of the amorphous or semi-amorphous Si$_3$N$_{4-x}$ ($0<x<4$) or Si$_x$C$_{1-x}$ ($0<x<1$) as referred to previously with respect to FIG. 1 but may be made of amorphous or semi-amorphous silicon.

The structure made up of the semiconductor layer 10, the metallic conductive layer 41 and the semiconductor layer 42 forming the semiconductor photoelectric conversion structure 7 is equivalent, in terms of function, to the semiconductor layer 10 in the third and fourth embodiments described previously in connection with FIGS. 3 and 4.

Accordingly, though not described in detail, the fifth and sixth embodiments of FIGS. 5 and 6 also have the same excellent features as those obtainable with the third and fourth embodiments of FIGS. 3 and 4.

With the fifth and sixth embodiments of the present invention, electric power generated across the electrode 22 and the semiconductor layer 10 of the semiconductor photoelectric conversion structure 7 by incidence of light 26 thereon can be obtained across the electrode 22 and the metallic conductive layer 41.

Consequently, by means of output leads 43 and 44 from the electrode 22 and the metallic conductive layer 41, respectively, it is possible to obtain oxygen and hydrogen gases from the redox reaction chamber 1 while at the same time utilizing the electric power generated in the photoelectric conversion semiconductor structure 7.

Incidentally, the foregoing embodiments should be construed as being merely illustrative of the present invention and it will be apparent that many modifications and variations may be effected without departing from the spirit of the present invention.

For example, in each of the above-described embodiments of the present invention, the photoelectric conversion semiconductor structure 7 may also be modified so that one PIN junction formed by the semiconductor layers 8, 9 and 10 is replaced with two or more such PIN junctions. In this case, since electric power of higher voltage than in the aforedescribed embodiments can be produced by the semiconductor photoelectric conversion structure 7, oxygen and hydrogen gases can be generated with higher efficiency than in the first to sixth embodiments described in the foregoing.

Moreover, in the foregoing embodiments of the present invention, it is also possible that the junctions between the semiconductor layers 8 and 9 and between 9 and 10 in the semiconductor photoelectric conversion structure 7 are made gradual as disclosed in U.S. Pat. No. 4,239,554, and that the semiconductor layer 8, on which the light 26 is incident, or the layers 8 and 9 are formed as so-called graded band gap type ones which have a wider band gap energy Eg than does the semiconductor layer 10 on the opposite side from the side on which the light 26 is incident. In this case, a high photoelectric conversion efficiency can be obtained with the semiconductor photoelectric conversion structure 7.

What is claimed is:

1. A light energy conversion system comprising:
  a redox reaction chamber provided with first and second cells intercommunicating through a bridge and respectively containing first and second aqueous solutions of the same kind, and first and second gas outlet means extending outwardly of the first and second cells, respectively;
  a semiconductor photoelectric conversion structure having a first non-single-crystalline semiconductor layer of a P or N first conductivity type, an I type second non-single-crystalline semiconductor layer formed on the first semiconductor layer, and a heavily doped, third non-single-crystalline semiconductor layer of a second conductivity type opposite that of the first conductivity type of the first non-single-crystalline semiconductor layer formed on the second non-single-crystalline semiconductor layer;
  a first electrode in contact with the first aqueous solution contained in the first cell of the redox reaction chamber;
  a second electrode connected to the first non-single-crystalline semiconductor layer of the photoelectric conversion semiconductor structure and paired with the first electrode; and
  means for electrically interconnecting the first and second electrodes; and
  wherein the semiconductor photoelectric conversion structure is provided in the second cell (a) so that it forms a part of the cell wall, (b) so that light is incident on the semiconductor photoelectric conversion structure directly without passing through the second aqueous solution, and (c) so that only the portion of the semiconductor photoelectric conversion structure on the side of the third non-single-crystalline semiconductor is held in contact with the second aqueous solution.

2. A light energy conversion system according to claim 1 wherein the bridge in the redox reaction chamber is an aqueous solution bridge which permits the passage therethrough of the first and second aqueous solutions contained in the first and second cells.

3. A light energy conversion system according to claim 1 wherein the bridge in the redox reaction chamber is an ion bridge permits the passage therethrough of ions generated in the aqueous solutions contained in the first and second cells.

4. A light energy conversion system according to claim 1, 2 or 3, wherein the second conductivity type of the third semiconductor layer is the N type, and wherein the first and second gas outlet means an oxygen and hydrogen gas outlet means, respectively.

5. A light energy conversion system according to claim 4, wherein the third semiconductor layer of the semiconductor photoelectric conversion structure is formed of Si$_3$N$_{4-x}$ ($0<x<4$) or Si$_x$C$_{1-x}$ ($0<x<1$).

6. A light energy conversion system according to claim 4 which further comprises aqueous solution inlet means for introducing into the first and second cells of the redox reaction chamber an aqueous solution serving as the first and second aqueous solutions therein.

7. A light energy conversion system according to claim 1, 2 or 3 wherein the second conductivity type of the third semiconductor layer is the P type, and wherein the first and second gas outlet means are hydrogen and oxygen gas outlet means, respectively.

8. A light energy conversion system according to claim 7, wherein the third semiconductor layer of the semiconductor photoelectric conversion structure is formed of Si$_3$N$_{4-x}$ ($0<x<4$) or Si$_x$C$_{1-x}$ ($0<x<1$).

9. A light energy conversion system according to claim 7 which further comprises aqueous solution inlet means for introducing into the first and second cells of the redox reaction chamber an aqueous solution serving as the first and second aqueous solutions therein.

10. A light energy conversion system according to claim 1, 2 or 3 wherein the third semiconductor layer of the semiconductor photoelectric conversion structure is formed of Si, germanium silicide, $Si_3N_{4-X}(0<X<4)$, or $Si_XC_{1-X}(0<X<1)$.

11. A light energy conversion system according to claim 10 wherein the first conductivity type of third non-single-crystalline semiconductor layer is the N type, and wherein the third non-single-crystalline semiconductor layer contains 0.01 to 3 mol % of Sb, As, or P as an N type impurity.

12. A light energy conversion system according to claim 11 which further comprises aqueous solution inlet means for introducing into the first and second cells of the redox reaction chamber an aqueous solution serving as the first and second aqueous solutions therein.

13. A light energy conversion system according to claim 10 wherein the first conductivity type of the third non-single-crystalline semiconductor layer is the P type, and the third non-single-crystalline semiconductor layer contains 0.01 to 3 mol % of In, Ga, or Al as a P type impurity.

14. A light energy conversion system according to claim 13 which further comprises aqueous solution inlet means for introducing into the first and second cells of the redox reaction chamber an aqueous solution serving as the first and second aqueous solutions therein.

15. A light energy conversion system according to claim 10 which further comprises aqueous solution inlet means for introducing into the first and second cells of the redox reaction chamber an aqueous solution serving as the first and second aqueous solutions therein.

16. A light energy conversion system according to claim 1, 2 or 3 which further comprises aqueous solution inlet means for introducing into the first and second cells of the redox reaction chamber an aqueous solution serving as the first and second aqueous solutions therein.

17. A light energy conversion system according to claims 1, 2, or 3 which further comprises a first lead connected to the third semiconductor layer of the photoelectric conversion semiconductor structure and a second lead connected to the second electrode.

* * * * *